US012388481B2

(12) United States Patent
Hur et al.

(10) Patent No.: US 12,388,481 B2
(45) Date of Patent: *Aug. 12, 2025

(54) BACKGROUND NOISE RECORDER

(71) Applicant: Apple Inc., Cupertino, CA (US)

(72) Inventors: Joonhoi Hur, Sunnyvale, CA (US); Jochen Schrattenecker, Alberndorf in der Riedmark (AT); Bin Xiao, San Ramon, CA (US); Andre Hanke, San Jose, CA (US); Harald Pretl, Schwertberg (AT); Rastislav Vazny, Saratoga, CA (US); Bernhard Sogl, Unterhaching (DE); Andreas Menkhoff, Oberhaching (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/743,593

(22) Filed: Jun. 14, 2024

(65) Prior Publication Data
US 2024/0333325 A1    Oct. 3, 2024

Related U.S. Application Data

(63) Continuation of application No. 17/716,724, filed on Apr. 8, 2022, now Pat. No. 12,047,101.
(Continued)

(51) Int. Cl.
*H04B 1/10* (2006.01)
*H04B 1/12* (2006.01)
*H04B 15/00* (2006.01)

(52) U.S. Cl.
CPC .......... *H04B 1/1027* (2013.01); *H04B 1/123* (2013.01); *H04B 15/005* (2013.01)

(58) Field of Classification Search
CPC .... H04B 1/1027; H04B 1/123; H04B 15/005; G01S 7/03; G01S 7/038; G01S 7/4021; G01S 13/04; G01S 7/40; G01S 7/006
See application file for complete search history.

(56) References Cited

U.S. PATENT DOCUMENTS 12,047,101 B2 *  7/2024  Hur ..................... G01S 7/038
2002/0163346 A1  11/2002  Arndt et al.
(Continued)

OTHER PUBLICATIONS

Mauricio Martins Donatti et al., Object identification using VSWR evaluation based on a narrowband microstrip antenna and a tuned amplifier, 2017 IEEE 8th Latin American Symposium On Circuits & Systems (LASCAS), Feb. 2017, pp. 1-4, IEEE, New York, New York, United States.

*Primary Examiner* — Sophia Vlahos
(74) *Attorney, Agent, or Firm* — Treyz Law Group, P.C.; Michael H. Lyons

(57) ABSTRACT

An electronic device may include wireless circuitry with a transmit antenna that transmits signals and a receive antenna that receives reflected signals. The wireless circuitry may detect a range between the device and an external object based on the transmitted signals and the reflected signals. When the range exceeds a first threshold, the wireless circuitry may use the transmitted signals and received signals to record background noise. When the range is less than a second threshold value, the wireless circuitry may detect the range based on the reflected signals and the recorded background noise. This may allow the range to be accurately measured within an ultra-short range domain even when the device is placed in different device cases, placed on different surfaces, etc.

20 Claims, 10 Drawing Sheets

Related U.S. Application Data

(60) Provisional application No. 63/248,169, filed on Sep. 24, 2021.

(56) References Cited

U.S. PATENT DOCUMENTS

| | | | |
|---|---|---|---|
| 2004/0214621 A1* | 10/2004 | Ponce De Leon | H01Q 1/242 455/575.8 |
| 2014/0278397 A1 | 9/2014 | Chen et al. | |
| 2015/0260828 A1 | 9/2015 | Ossowska | |
| 2015/0382307 A1* | 12/2015 | Harper | H04B 7/022 455/127.1 |
| 2019/0072660 A1 | 3/2019 | Wang et al. | |
| 2020/0271753 A1 | 8/2020 | Va et al. | |
| 2020/0321928 A1 | 10/2020 | Rao et al. | |
| 2021/0133399 A1* | 5/2021 | Coelho De Souza | G06F 3/04883 |
| 2021/0302528 A1 | 9/2021 | Wang | |
| 2021/0323574 A1* | 10/2021 | Yoo | G01C 21/3407 |
| 2022/0291338 A1 | 9/2022 | Hur et al. | |

* cited by examiner

BACKGROUND NOISE RECORDER

This application is a continuation of U.S. patent application Ser. No. 17/716,724, filed Apr. 8, 2022, which claims the benefit of U.S. provisional patent application No. 63/248,169, filed Sep. 24, 2021, each of which is hereby incorporated by reference herein in its entirety.

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is sometimes used to perform spatial ranging operations in which radio-frequency signals are used to estimate a distance between the electronic device and an external object.

It can be challenging to provide wireless circuitry that accurately estimates this distance, particularly at short ranges.

SUMMARY

An electronic device may include wireless circuitry controlled by one or more processors. The wireless circuitry may include a transmit antenna and a receive antenna. The transmit antenna may transmit radio-frequency signals. The receive antenna may receive reflected signals corresponding to the transmitted radio-frequency signals. The wireless circuitry may detect a range between the device and an external object based on the transmitted radio-frequency signals and the received reflected signals.

When the range exceeds a first threshold value (e.g., in a long-range domain), the wireless circuitry may use the transmitted and received signals to record background noise associated with the absence of the external object near the device. When the range is less than a second threshold value (e.g., within an ultra-short range (USR) domain), the one or more processors may detect the range based on the received reflected signals and the recorded background noise. For example, the one or more processors may identify phase information from the received reflected signals and may subtract the recorded background noise from the phase information. This may allow the range to be accurately measured within the USR domain even when the device is placed in different device cases, placed on different surfaces, etc.

An aspect of the disclosure provides a method of operating an electronic device. The method can include with wireless circuitry, transmitting radio-frequency signals and receiving reflected signals to identify a range between an external object and the electronic device. The method can include when the range exceeds a threshold value, controlling the wireless circuitry to record background noise using the transmitted radio-frequency signals. The method can include with the wireless circuitry, performing phase measurements from the received reflected signals. The method can include with the wireless circuitry, detecting the range based on the phase measurements and the recorded background noise.

An aspect of the disclosure provides a method of operating an electronic device. The method can include with wireless circuitry, performing frequency-modulated continuous-wave (FMCW) radar operations to identify a range between an external object and the electronic device by transmitting radio-frequency signals and receiving reflected signals. The method can include when the range exceeds a first threshold value, recording background noise at the wireless circuitry using the transmitted radio-frequency signals. The method can include when the range is less than a second threshold value that is lower than the first threshold value, performing phase measurements from the received reflected signals and detecting the range based on the phase measurements and the recorded background noise.

An aspect of the disclosure provides an electronic device. The electronic device can include one or more antennas configured to transmit radio-frequency signals and configured to receive reflected signals. The electronic device can include one or more processors. The one or more processors can be configured to identify a range between the electronic device and an external object based on the reflected signals received by the one or more antennas. The one or more processors can be configured to, when the range exceeds a first threshold value, record background noise using the radio-frequency signals transmitted by the one or more antennas and corresponding signals received by the one or more antennas. The one or more processors can be configured to, when the range is less than a second threshold value that is lower than the first threshold value, detect the range based on phase measurements from the reflected signals received by the one or more antennas and based on the recorded background noise.

DETAILED DESCRIPTION

Figure 1:
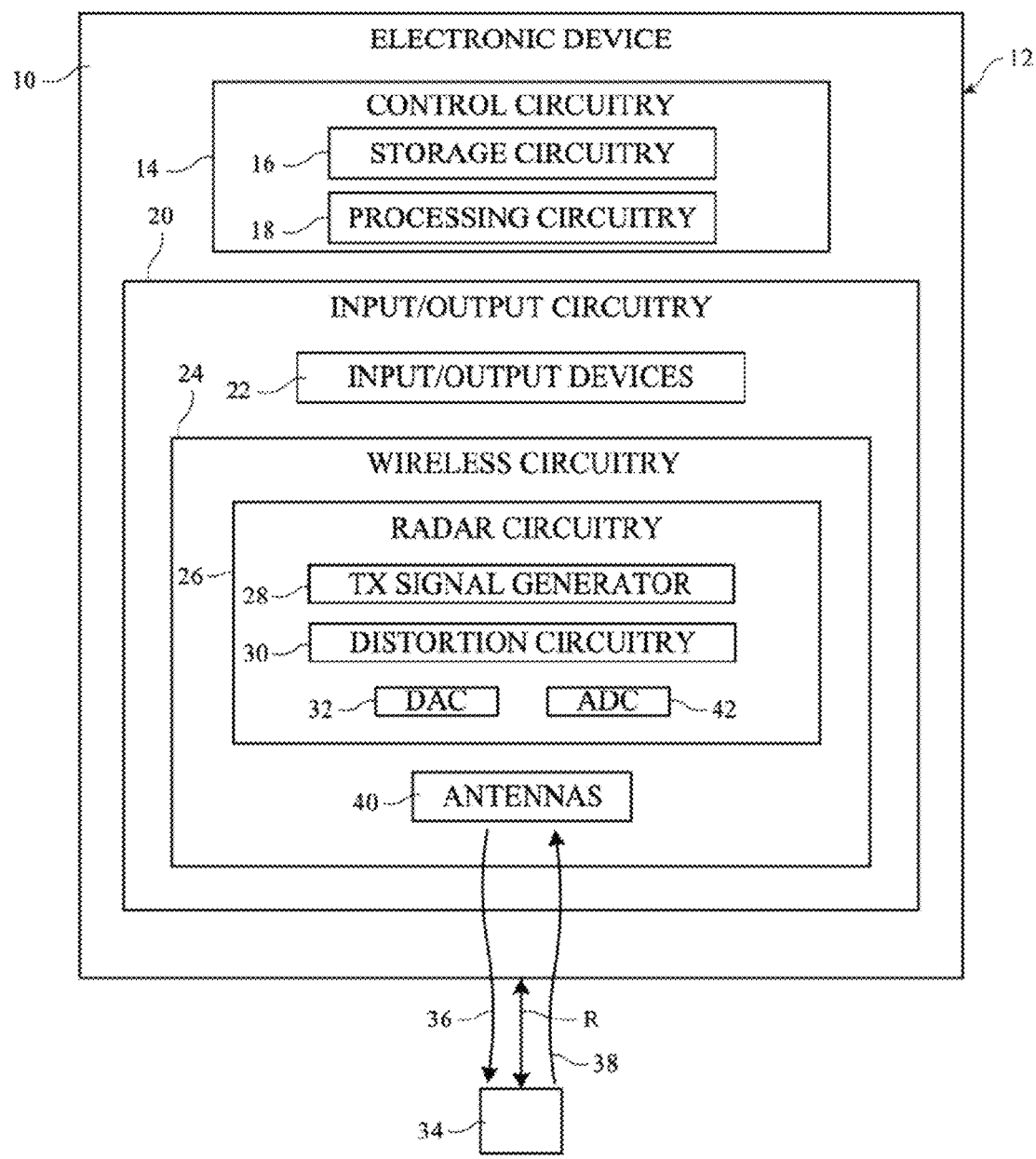
FIG. 1 is a functional block diagram of an illustrative electronic device having radar circuitry in accordance with some embodiments.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols-sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP 5G protocols, 6G protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include two or more antennas 40. Wireless circuitry 24 may also include baseband processor circuitry, transceiver circuitry, amplifier circuitry, filter circuitry, switching circuitry, radio-frequency transmission lines, and/or any other circuitry for transmitting and/or receiving radio-frequency signals using antennas 40.

Wireless circuitry 24 may transmit and/or receive radio-frequency signals within a corresponding frequency band at radio frequencies (sometimes referred to herein as a communications band or simply as a "band"). The frequency bands may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHZ, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Antennas 40 may be formed using any desired antenna structures. For example, antennas 40 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antennas 40 over time.

The radio-frequency signals handled by antennas 40 may be used to convey wireless communications data between device 10 and external wireless communications equipment (e.g., one or more other devices such as device 10). Wireless communications data may be conveyed by wireless circuitry 24 bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Wireless circuitry 24 may additionally or alternatively perform spatial ranging operations using antennas 40. In scenarios where wireless circuitry 24 both conveys wireless communications data and performs spatial ranging operations, one or more of the same antennas 40 may be used to both convey wireless communications data and perform spatial ranging operations. In another implementation, wireless circuitry 24 may include a set of antennas 40 that only conveys wireless communications data and a set of antennas 40 that is only used to perform spatial ranging operations.

When performing spatial ranging operations (sometimes referred to herein as range detection operations, ranging operations, or radar operations), antennas 40 may transmit radio-frequency signals 36. Wireless circuitry 24 may transmit radio-frequency signals 36 in a corresponding radio frequency band such (e.g., a frequency band that includes frequencies greater than around 10 GHz, greater than around 20 GHz, less than 10 GHz, etc.). Radio-frequency signals 36 may reflect off of objects external to device 10 such as external object 34. External object 34 may be, for example, the ground, a building, a wall, furniture, a ceiling, a person, a body part, an accessory device, a game controller, an animal, a vehicle, a landscape or geographic feature, an obstacle, or any other object or entity that is external to device 10. Antennas 40 may receive reflected radio-frequency signals 38. Reflected signals 38 may be a reflected version of the transmitted radio-frequency signals 36 that have reflected off of external object 34 and back towards device 10.

Control circuitry 14 may process the transmitted radio-frequency signals 36 and the received reflected signals 38 to detect or estimate the range R between device 10 and external object 34. If desired, control circuitry 14 may also process the transmitted and received signals to identify a two or three-dimensional spatial location (position) of external object 34, a velocity of external object 34, and/or an angle of arrival of reflected signals 38. In one implementation that is described herein as an example, wireless circuitry 24 performs spatial ranging operations using a frequency-modulated continuous-wave (FMCW) radar scheme. This is merely illustrative and, in general, other radar schemes or spatial ranging schemes may be used (e.g., an OFDM radar scheme, an FSCW radar scheme, a phase coded radar scheme, etc.).

To support spatial ranging operations, wireless circuitry 24 may include spatial ranging circuitry such as radar circuitry 26. In one embodiment that is sometimes described herein as an example, radar circuitry 26 includes FMCW radar circuitry that performs spatial ranging using an FMCW radar scheme. Radar circuitry 26 may therefore sometimes be referred to herein as FMCW radar circuitry 26. Radar circuitry 26 may use one or more antennas 40 to transmit radio-frequency signals 36 (e.g., as a continuous wave of radio-frequency energy under an FMCW radar scheme). One or more antennas 40 may also receive reflected signals 38 (e.g., as a continuous wave of radio-frequency energy under the FMCW radar scheme). Radar circuitry 26 may process radio-frequency signals 36 and reflected signals 38 to identify/estimate range R, the position of external object 34, the velocity of external object 34, and/or the angle-of-arrival of reflected signals 38. In embodiments where radar circuitry 26 uses an FMCW radar scheme, doppler shifts in the continuous wave signals may be detected and processed to identify the velocity of external object 34 and the time dependent frequency difference between radio-frequency signals 36 and reflected signals 38 may be detected and processed to identify range R and/or the position of external object 34. Use of continuous wave signals for estimating range R may allow control circuitry 10 to reliably distinguish between external object 34 and other background or slower-moving objects, for example.

As shown in FIG. 1, radar circuitry 26 may include transmit (TX) signal generator circuitry such as transmit signal generator 28. Transmit signal generator 28 may generate transmit signals for transmission over antenna(s) 40. In some implementations that are described herein as an example, transmit signal generator 28 includes a chirp generator that generates chirp signals for transmission over antenna(s) 40 (e.g., in embodiments where radar circuitry 26 uses an FMCW radar scheme). Transmit signal generator 28 may therefore sometimes be referred to herein as chirp generator 28. Transmit signal generator 28 may, for example, produce chirp signals that are transmitted as a continuous wave of radio-frequency signals 36. The chirp signals may be formed by periodically ramping up the frequency of the transmitted signals in a linear manner over time, for example. Radar circuitry 26 may also include digital-to-analog converter (DAC) circuitry such as DAC 32. DAC 32 may convert the transmit signals (e.g., the chirp signals) from the digital domain to the analog domain prior to transmission by antennas 40 (e.g., in radio-frequency signals 36). Radar circuitry 26 may also include analog-to-digital converter (ADC) circuitry such as ADC 42. ADC 42 may convert signals from the analog domain to the digital domain for subsequent processing by control circuitry 14. If desired, radar circuitry 26 may include distortion circuitry 30. Distortion circuitry 30 may include predistortion circuitry that predistorts the transmit signals prior to transmission by antennas 40 and/or may include post-distortion circuitry that distorts received signals.

The example of FIG. 1 is merely illustrative. While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). As an example, control circuitry 14 may include baseband circuitry (e.g., one or more baseband processors), digital control circuitry, analog control circuitry, and/or other control circuitry that forms part of radar circuitry 26. The baseband circuitry may, for example, access a communication protocol stack on control circuitry 14 (e.g., storage circuitry 20) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC layer, and/or non-access stratum layer. If desired, the PHY layer operations may additionally or alternatively be performed by radio-frequency (RF) interface circuitry in wireless circuitry 24.

If desired, radar circuitry 26 may be used to measure the proximity of a human body to antennas 40. Measurement of this proximity (e.g., range R) may allow the device to adjust the transmit power level of antennas 40 (e.g., based on range R) to ensure that wireless circuitry 24 complies with regulatory requirements on radio-frequency exposure (RFE). For example, the transmit power level and/or transmit duration of the wireless circuitry can be reduced and/or different antennas can be switched into use when range R is small to ensure compliance with these requirements. When no external object 34 is located close to antennas 40 (e.g., when range R is high), wireless circuitry 24 may transmit radio-frequency signals at a maximum transmit power level, thereby maximizing throughput. In general, radar circuitry 26 needs to be very accurate to perform such detection of a human body (sometimes referred to herein as body proximity sensing (BPS)). However, a relatively high dynamic range is needed to resolve a wide number of ranges R (e.g., limits in dynamic range can limit the overall detection range of radar circuitry 26). If care is not taken, it can be difficult to configure radar circuitry 26 to detect range R over both relatively long distances (e.g., ranges greater than around 10 cm, generally referred to herein as "long range") and relatively short distances (e.g., ranges less than around 10 cm, generally referred to herein as "ultra-short range (USR)") with sufficient dynamic range.

Figure 2:
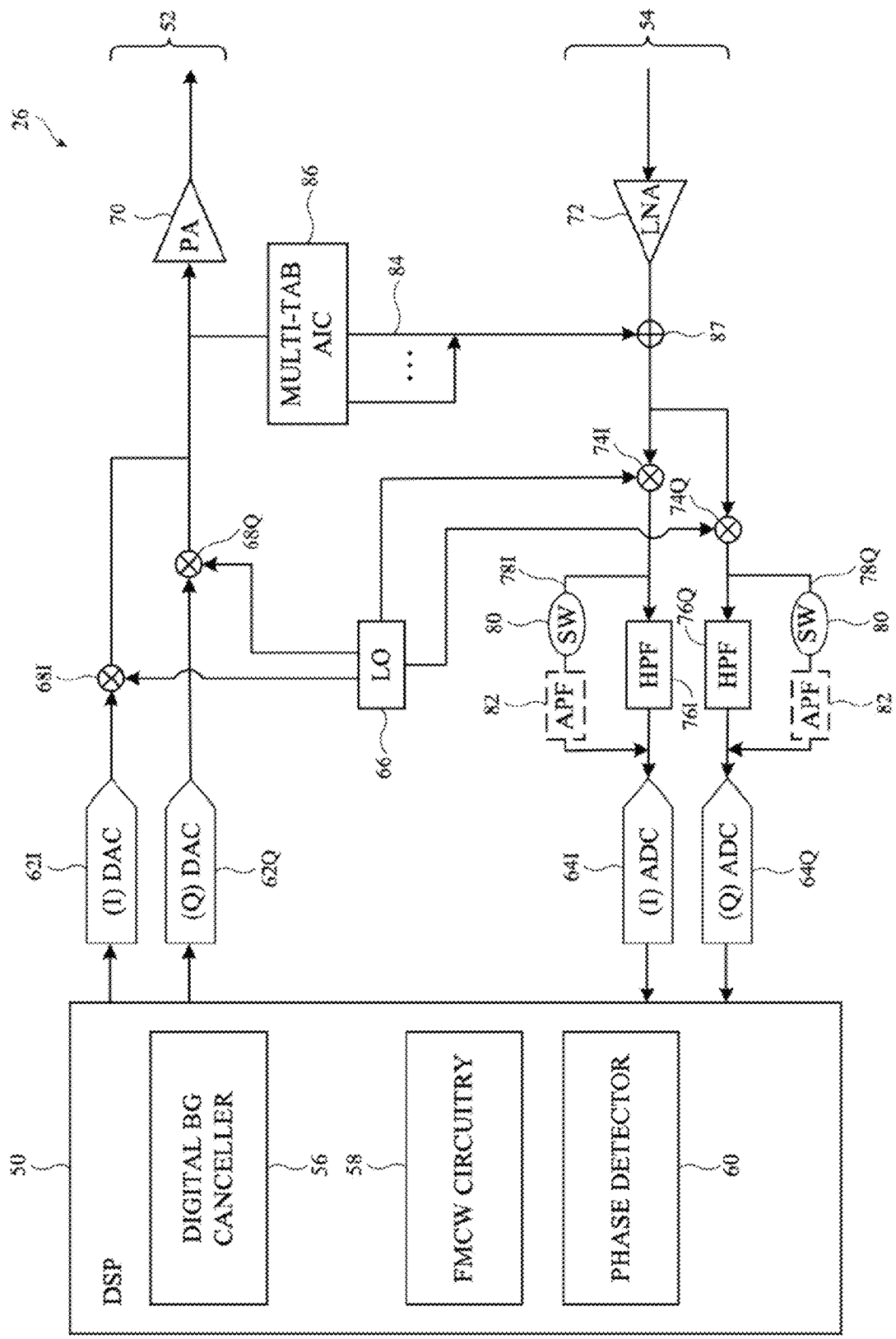
FIG. 2 is a circuit diagram of illustrative radar circuitry with reconfigurable filters for performing long range and ultra-short range (USR) detection in accordance with some embodiments.

To allow radar circuitry 26 to perform spatial ranging operations within both the long range domain (sometimes referred to herein as the far field domain) and within the USR domain, radar circuitry 26 may include reconfigurable high pass filters. FIG. 2 is a circuit diagram of radar circuitry 26 having reconfigurable high pass filters.

As shown in FIG. 2, radar circuitry 26 may include a transmit chain 52 (sometimes referred to herein as transmitter chain 52, transmit line-up 52, or transmit path 52) and a receive chain 54 (sometimes referred to herein as receiver chain 54, receive line-up 54, or receive path 52). Transmit (TX) chain 52 may include a digital-to-analog converter (DAC) such as DAC 62. DAC 62 may include an in-phase (I) DAC 62I that operates on in-phase (I) signals and a quadrature-phase (Q) DAC 62Q that operates on quadrature-phase (Q) signals (e.g., of an I/Q signal pair). Transmit chain 52 may include mixers 68 (e.g., an in-phase mixer 68I and a quadrature phase mixer 68Q) having first inputs coupled to the outputs of DACs 62I and 62Q and having second inputs coupled to clocking circuitry such as local oscillator (LO) 66. Mixers 68 may have outputs coupled to the input of power amplifier (PA) 70 in transmit chain 52. The output of PA 70 may be coupled to a first antenna 40 (FIG. 1).

Receive (RX) chain 54 may include a low noise amplifier (LNA) 72 and mixers 74 (e.g., an in-phase mixer 74I and a quadrature-phase mixer 74Q) having first inputs coupled to the output of LNA 72 and having second inputs coupled to LO 66. The input of LNA 72 may be coupled to a second antenna 40 (FIG. 1). Receive chain 54 may include high pass filters 76 having inputs coupled to mixers 74 and having outputs coupled to analog-to-digital converter (ADC) 64 (e.g., an in-phase (I) ADC 64I and a quadrature-phase (Q) ADC 34Q). For example, a first high pass filter 76I may be interposed between the output of mixer 74I and the input of ADC 64I and a second high pass filter 76Q may be interposed between the output of mixer 74Q and the input of ADC 64Q. The outputs of ADC 64I and 64Q and the inputs of DACs 62I and 62Q may be coupled to digital signal processor (DSP) 50. DSP 50 may include a digital background (BG) canceller 56, FMCW or other long range radar circuitry such as FMCW circuitry 58, and phase detector 60.

High pass filters 76I and 76Q may be reconfigurable (bypassable). For example, a bypass path 78I may couple the input of high pass filter (HPF) 76I to the output of HPF 76I. Similarly, a bypass path 78Q may couple the input of HPF 76Q to the output of HPF 76Q. Switches such as switches (SW) 80 may be disposed on bypass paths 78I and 78Q. If desired, an optional all pass filter (APF) 82 may be disposed on bypass paths 78I and 78Q (e.g., between switch 80 and ADC 64). Switches 80 may have a first state (e.g., where switches 80 are closed or turned on) in which HPFs 76 are bypassed and may have a second state (e.g., where switches 80 are open or turned off) in which HPFs 76 are switched into use and bypass paths 78 form open circuits.

If desired, a feedback path 84 may couple transmit chain 52 to receive chain 54. A de-chirp path may additionally or alternatively couple transmit chain 52 to a de-chirp mixer in receive chain 54. As shown in FIG. 2, feedback path 84 may include an optional multi-tab analog interference canceller 86 having an output coupled to an adder such as adder 87 in receive chain 54. Adder 87 and/or feedback path 84 may be omitted if desired. The example of FIG. 2 is merely illustrative. In general, other circuit architectures may be used to form radar circuitry 26. Additional filters, amplifiers, switches, delay stages, splitters, and/or other circuit components may be formed at other locations in radar circuitry 26.

When performing spatial ranging (radar) operations, transmit signal generator 28 (FIG. 1) may generate transmit signals (e.g., digital chirp signals) for subsequent transmission by the antenna coupled to transmit chain 52 (e.g., using a continuous wave of radio-frequency energy). FMCW circuitry 58 may, for example, control the transmit signal generator to generate desired transmit signal waveforms. If desired, digital BG canceler 56 may perform background cancellation (pre-compensation) on the generated transmit signals. DAC 62 may convert the transmit signals to the digital domain. Mixers 68 may upconvert the transmit signals to radio frequencies or intermediate frequencies for later upconversion to radio-frequencies (e.g., using a local oscillator (LO) signal from LO 66). These frequencies may be 5G NR FR1 or FR2 frequencies, for example. PA 70 may amplify the transmit signals for transmission by the corresponding antenna 40 coupled to transmit chain 52 (e.g., as radio-frequency signals 36 of FIG. 1).

The antenna 40 coupled to receive chain 54 may receive reflected signals 38 (e.g., a reflected version of the transmit signals transmitted over transmit chain 52). LNA 72 may amplify the received reflected signals 38. Mixers 74 may downconvert the reflected signals to baseband. During long range detection, switches 80 may be open (e.g., bypass paths 78 may form open circuits) and HPFs 76 may filter the received reflected signals to output filtered signals. ADC 64 may convert the filtered signals to the digital domain for subsequent processing by DSP 50. FMCW circuitry 58 may process the transmit signals provided to transmit chain 52 and the reflected signals received over receive chain 54 to identify range R to external object 34. For example, FMCW circuitry 58 may detect (e.g., identify) time delays between the transmitted and received signals, may generate time of flight (TOF) information for the signals, and may identify (e.g., generate, compute, calculate, etc.) range R from the TOF information. HPFs 76 may serve to filter out leakage/interference signal (e.g., from coupling or a dielectric cover layer on device 10 through which the radio-frequency signals and reflected signals pass) from the received reflected signals, thereby maximizing the signal-to-noise ratio SNR and dynamic range of the received signals to allow for accurate long range measurements of range R.

When performing USR measurements, the high dynamic range required for long range detection is not needed. As such, HPFs 76 may be bypassed or switched out of use while performing USR measurements. For example, switches 80 may be closed, allowing the received reflected signals to pass from mixers 74 directly to ADC 64 without being filtered. If desired, APFs 82 may filter these signals to correct for imperfections in the channel response, for example. Phase detector 60 may process the received reflected signals to identify (e.g., generate, detect, estimate, measure, etc.) the phase and/or phase delay of the signals (e.g., group phase delay), in a process sometimes referred to herein as performing phase measurements. Control circuitry 14 (FIG. 1) may determine (e.g., identify, generate, calculate, etc.) range R based on the identified phase delay (based on the phase measurements). If desired, digital BG canceller 56 may perform BG noise cancellation on the transmitted and/or received signals used to perform USR detection. HPFs 76 may be replaced with DC notch filters if desired.

Figure 3:
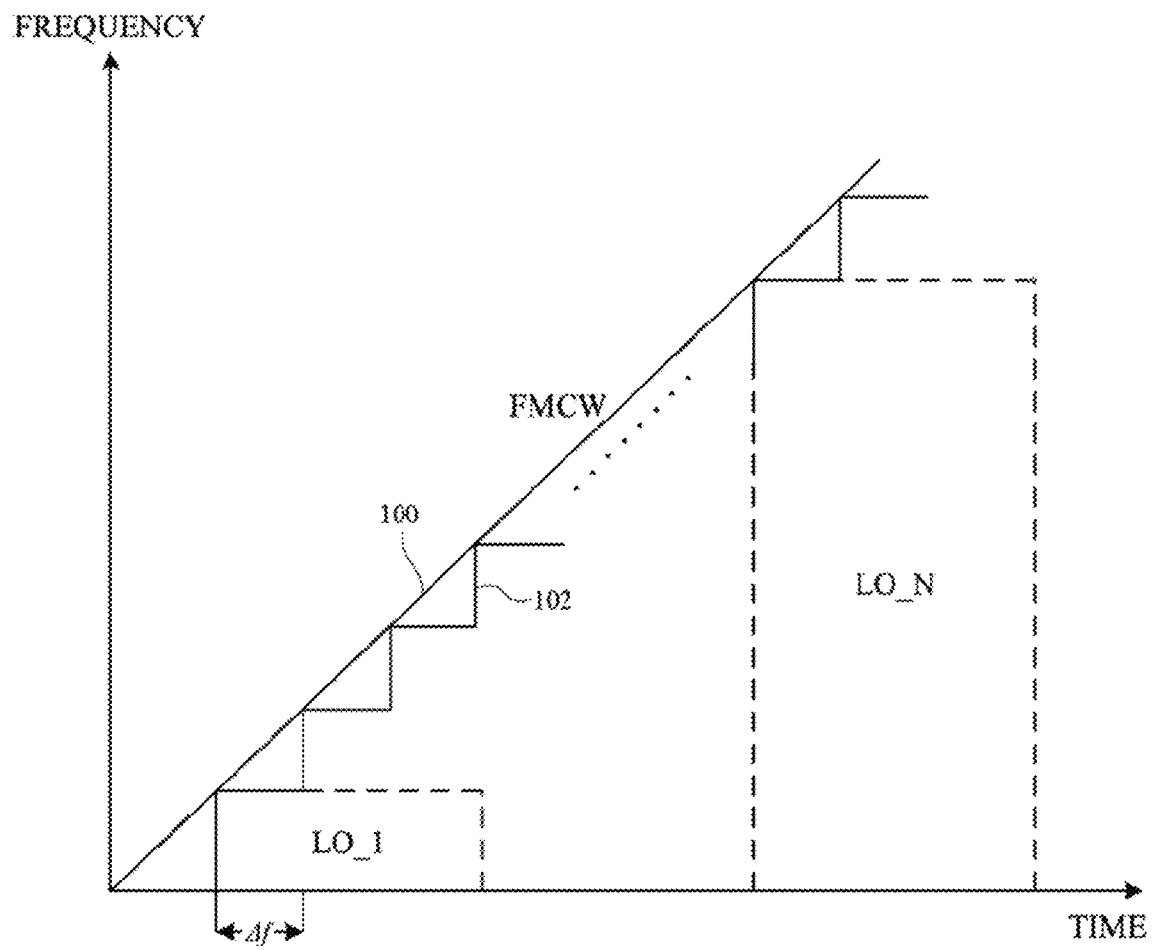
FIGS. 3 and 4 are diagrams of illustrative transmit signals that may be used by radar circuitry to perform long range and USR detection in accordance with some embodiments.

FIG. 3 is a diagram (in frequency as a function of time) of illustrative transmit signals that may be transmitted over transmit chain 52 for performing long range and USR detection. Curve 100 plots a digital FMCW or continuous FMCW signal (e.g., a frequency ramp or chirp signal) that may be transmitted for performing long range detection (e.g., while HPFs 76 are switched into use in the receive chain). Curve 102 plots discrete frequencies (e.g., a step function in frequency versus time) that may be used in the transmit signal for performing USR detection. If desired, LO 66 may generate coarse steps LO_1 through LO_N used in generating the transmit signal whereas the finer steps or continuous steps are provided from DAC 62 of FIG. 2. The example of FIG. 3 is merely illustrative and, in general, curves 100 and 102 may have other shapes.

Figure 4:
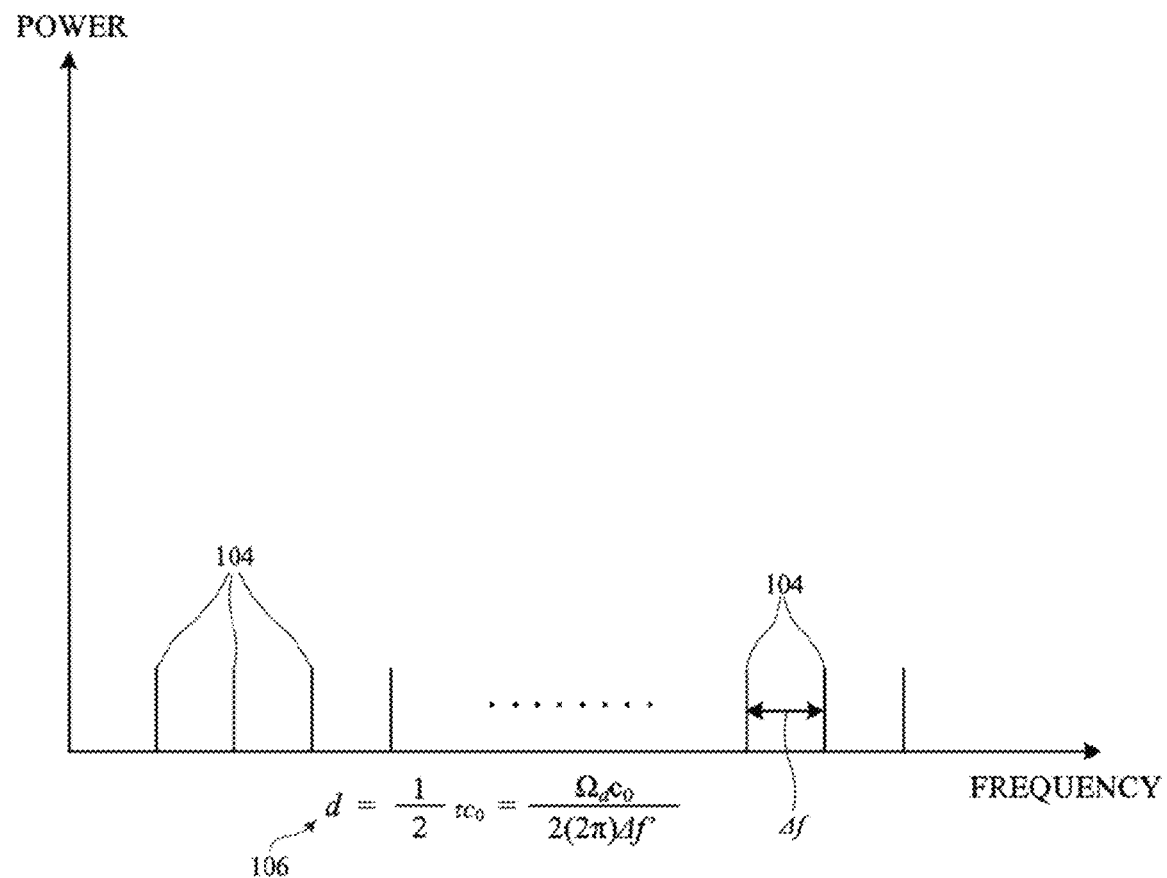

FIG. 4 is a plot of the transmit signals associated with curve 102 of FIG. 3 that may be used in performing USR detection, but in units of power as a function of frequency. As shown in FIG. 4, the transmit signal involves a series of peaks (lines) 104 each separated by frequency gap Δf. Control circuitry 14 may process the transmit signal associated with peaks 104 as well as the reflected version of the transmit signal (e.g., as received while HPFs 76 are bypassed) to identify range R to the external object (e.g., using equation 106). As shown by equation 106, distance d (range R) may be computed as a function of the measured phase delay detected by phase detector 60 from the received reflected version of transmit signal 104 (e.g., where 52*a* is a factor that accounts for the phase delay, co is the speed of light, and t is a complex phase delay factor). Control circuitry 14 may identify range R (distance d) using equation 106 or by comparing the measured phase delay to a look up table of predetermined phase delays stored on device 10 (e.g., where each stored phase delay corresponds to a stored distance d that is retrieved by comparing the measured phase delay to the predetermined phase delays in the look up table).

Figure 5:
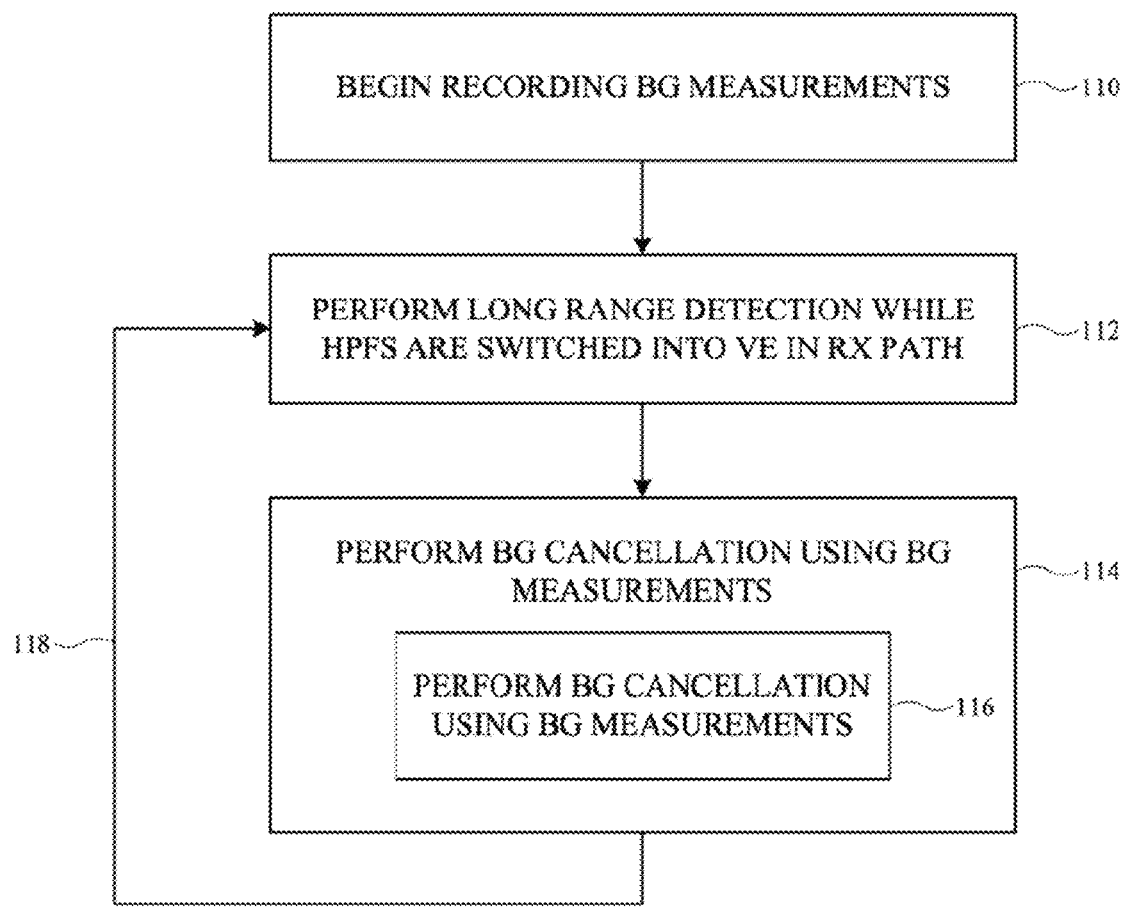
FIG. 5 is a flow chart of illustrative operations involved in using an electronic device to perform both long range and USR detection in accordance with some embodiments.

FIG. 5 is a flow chart of illustrative operations involved in performing ranging using radar circuitry 26. At operation 110, radar circuitry 26 may begin recording (gathering) background noise measurements. For example, radar circuitry 26 may perform USR detection when no objects are present near device 10 to measure background noise associated with the housing for device 10, a removable case on device 10, etc. This background noise may later be subtracted off of subsequent USR detections to generate accurate ranges R for objects within 10 cm.

At operation 112, radar circuitry 26 may perform long range detection (e.g., using the transmit signal associated with curve 100 of FIG. 3, such as using an FMCW scheme and transmit signal). HPFs 76 may be switched into use and may filter the received reflected signals to maximize dynamic range. Control circuitry 14 may identify range R based on the transmitted and reflected signals (e.g., by identifying TOF information from time delays between the transmitted and reflected signals).

At operation 114, radar circuitry 26 may perform USR detection (e.g., using the transmit signal associated with curve 102 of FIG. 3). HPFs 76 may be switched out of use (bypassed). Phase detector 60 may measure the phase delay of the received reflected signals (e.g., may perform phase measurements). Control circuitry 14 may process the phase delay to identify range R based on the phase delay (e.g., either as input to a function or by comparison to stored information such as look up table information mapping predetermined/calibrated ranges to phase delays). Control circuitry 14 may also perform background noise cancellation using the gathered BG measurements to ensure that the identified range R is accurate (at operation 116). The background noise cancellation may occur in the digital domain, for example (e.g., at DSP 50 of FIG. 2). Processing may then loop back to operation 112 via path 118 (e.g., radar circuitry 26 may perform long range detection and USR detection in a time-interleaved/duplexed manner).

If desired, analog interference cancellation may also be performed using multi-tab AIC 86 of FIG. 2. For example, AIC 86 may be used to perform coefficient adaption from background measurements and analog multi-tab cancellation may be performed. However, analog interference cancellation may undesirably increase RF hardware complexity, reduce tunability, and degrade SNR. Performing digital BG cancellation using digital BG canceller 56 of FIG. 2 may allow DSP 50 to perform coefficient adaptation from background measurements, where the background measurements are subtracted in the complex domain from the transmitted and/or received signals (e.g., at operation 116 of FIG. 5). Digital BG cancellation may involve greater hardware flexibility than analog cancellation.

Figure 6:
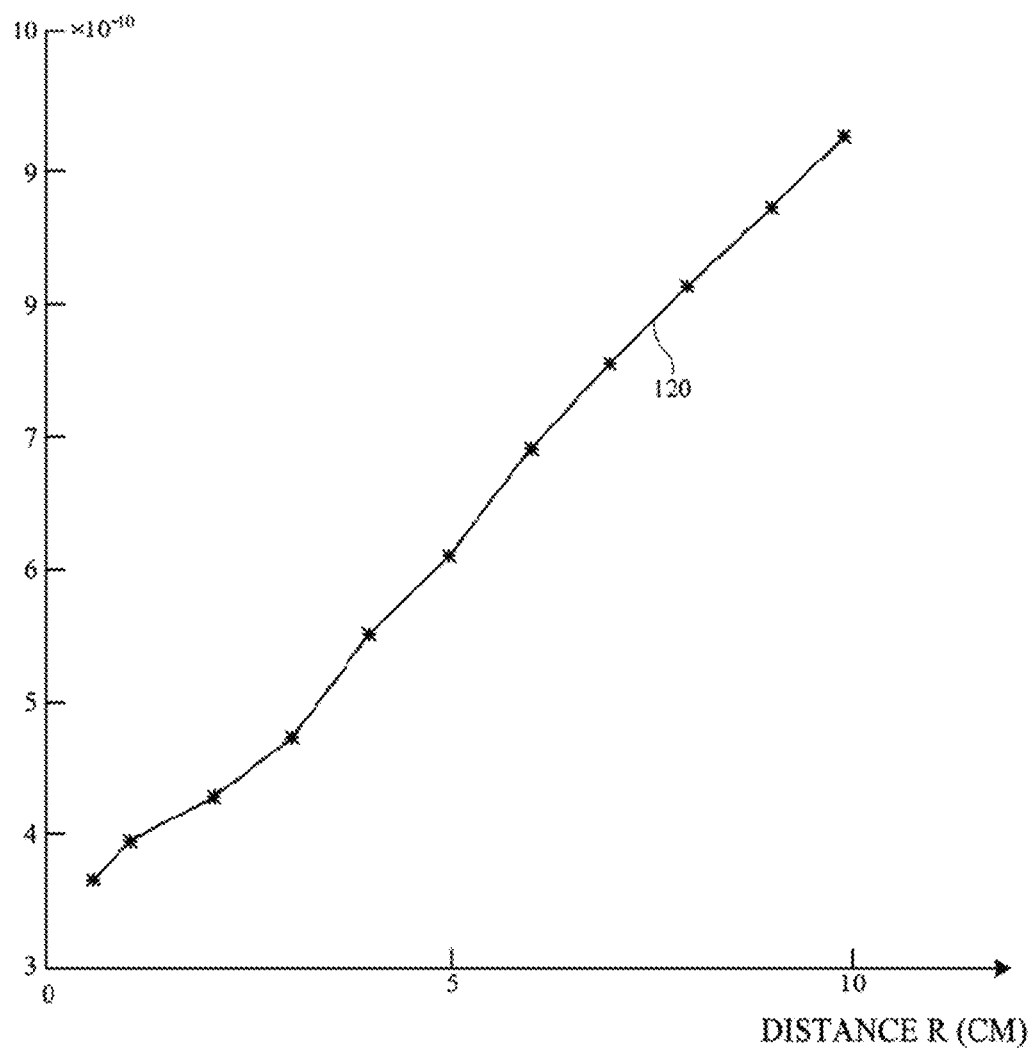
FIG. 6 is a plot of group delay as a function of range that shows how using radar circuitry to measure group delay may allow the radar circuitry to detect distance in accordance with some embodiments.

FIG. 6 is a plot showing how measured group delay may vary as a function of distance (range R) to external object 34. As shown by curve 120, group delay generally increases as range (distance) R increases. Bypassing HPFs 76 and performing digital BG cancellation may allow device 10 to perform USR detection based on the measured group delay with finer resolution than would otherwise be possible (e.g., within 4 cm or less).

Figure 7:
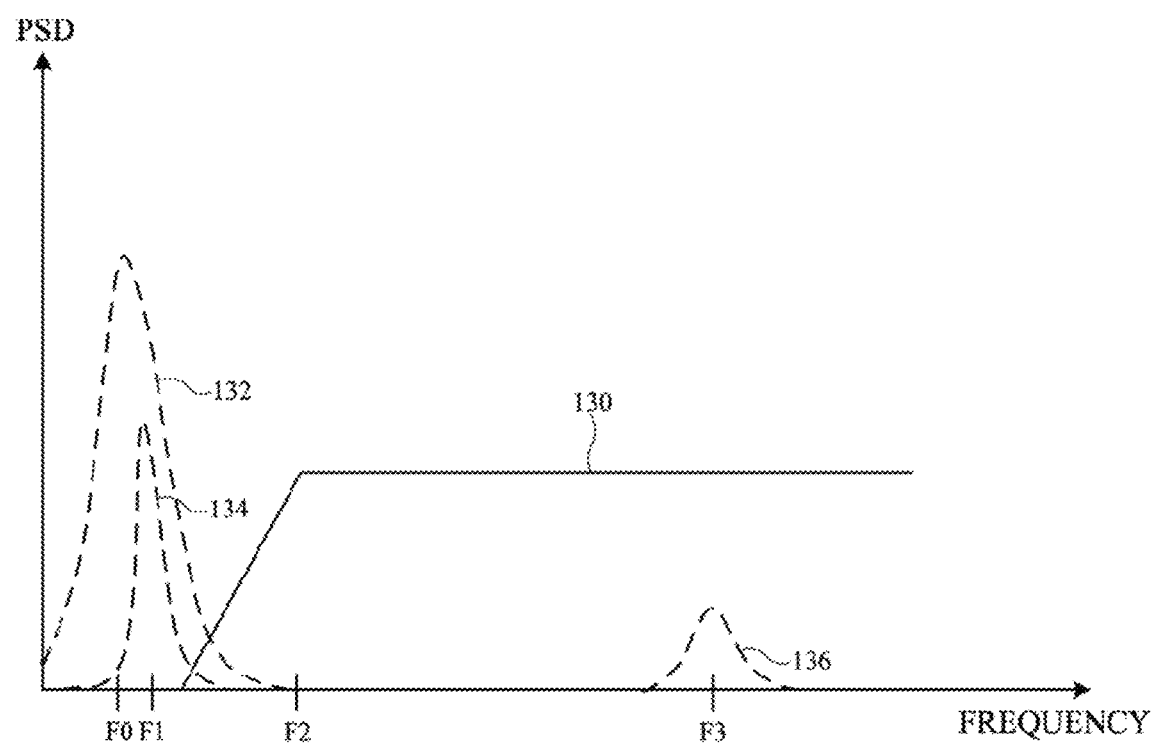
FIG. 7 is a diagram showing how an illustrative high pass filter may be used to maximize signal-to-noise ratio for long range detection in accordance with some embodiments.

FIG. 7 is a plot showing how HPFs 76 may be used to maximize dynamic range for long range detection (in power spectral density (PSD) as a function of frequency). Curve 132 of FIG. 7 plots the PSD at the antennas generated by signal leakage or coupling as the transmit signals and reflected signals pass through the cover layer(s) of device 10 from free space to antennas 40. Curve 132 may peak at a frequency such as frequency F0. Curve 134 plots the expected PSD produced at the antennas by reflection of the transmit signals off external object 34 located within the USR domain (e.g., within 10 cm). Curve 134 may peak at a frequency such as frequency F1. Curve 136 plots the expected PSD produced by reflection of the transmit signals off external object 34 located within the long range domain (e.g., beyond 10 cm). Curve 136 may peak at a frequency such as frequency F3.

Curve 130 plots the filter response of HPFs 76. As shown by curve 130, HPFs 76 may have a roll off (edge) frequency F2, a pass band at frequencies greater than F2, and a stop band (e.g., notch) at frequencies less than F2. Frequency F2 may be selected to be greater than frequency F1 and less than frequency F3. In this way, HPFs 76 may filter out the PSD associated with leakage or coupling (curve 132) from the reflected signals received and measured by radar circuitry 26. This may serve to maximize dynamic range for detecting range R to external object 34 in the long range domain. Since curve 134 is below frequency F2, HPFs 76 need to be disabled (bypassed) to allow radar circuitry 26 to receive the PSD produced by reflection off external object 34 (curve 134), which is then used to identify the range to the external object (e.g., within 10 cm).

Figure 8:
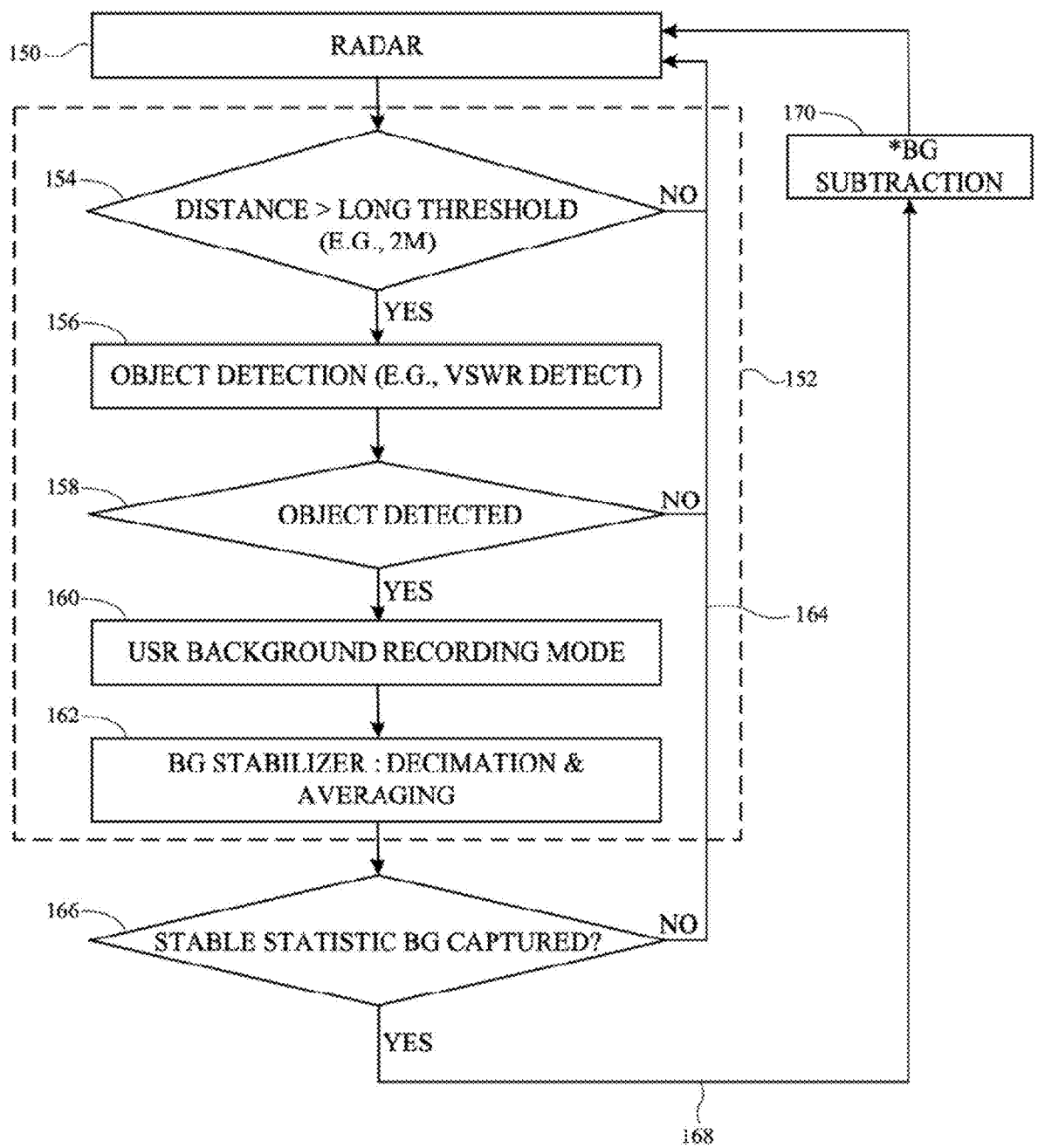
FIG. 8 is a flow chart of illustrative operations involved in performing background recording and cancellation in accordance with some embodiments.

As described above, USR detection may involve the cancellation (subtraction) of background noise (e.g., at operation 116 of FIG. 5). Background noise cancellation may allow for USR detection with fine range resolution. FIG. 8 is a flow chart of illustrative operations involved in gathering background measurements (e.g., as begun at operation 110 of FIG. 5) and in applying the gathered background measurements to USR detection operations (e.g., via background subtraction).

At operation 150, radar circuitry 26 may perform radar operations (e.g., long range detection or USR detection at operations 112/114 of FIG. 5). Radar circuitry 26 may identify range R by performing radar operations, for example. Radar circuitry 26 may perform background recording operations/algorithm 152 (e.g., gathering and storing of background noise measurements for use in later background cancellation while performing USR operations) periodically, upon boot up, in the factory, upon software update, and/or in response to any desired trigger condition.

At operation 154, control circuitry 14 may determine whether range R exceeds a long threshold value (e.g., 2 m, 10 cm, 1 m, other values greater than or equal to 1 m or 0.5 m, etc.). If range R is less than this threshold value, there is an external object 34 located relatively close to device 10 and any subsequent measurements will not be indicative of the true background noise of the radar circuitry. As such, if range R does not exceed the long threshold value, processing may loop back to operation 150 via path 164. Range R may be determined using range circuitry 26 and/or other sensors on device 10 if desired.

If range R is greater than the long threshold value, there are no external objects 34 located relatively close to device 10 and processing may proceed to operation 156. At operation 156, radar circuitry 26 may perform other object detection (e.g., inanimate object detection) if desired. This may involve performing object detection using other proximity sensors such as a voltage standing wave ratio (VSWR) sensor coupled to one or more antennas 40.

At operation 158, control circuitry 14 may determine whether an object was detected at operation 156. This may involve, for example, comparing VSWR values to stored VSWR values associated with known inanimate objects or may involve tracking changes in measured VSWR values over time (e.g., where the amount of change in the VSWR values over time is less than a threshold amount over a predetermined time period). If no inanimate object is detected, processing may loop back to path 150 via path 164. If an inanimate object is detected, this may be indicative of a device case or other inanimate object being present on device 10. It would therefore be desirable to be able to characterize the background noise effects (e.g., which produces the PSD associated with curve 132 of FIG. 7) that such an inanimate object has on radar circuitry 26 (e.g., for later subtraction of the effects of the inanimate object on measurements of range R due to signal reflections, attenuation, diffraction, etc. as the signals pass through the inanimate object). In other words, if an inanimate object is detected, processing may proceed to operation 160.

At operation 160, radar circuitry 16 may enter a USR background recording mode in which radar circuitry 16 gathers (measures) and stores background noise using the transmitted and received signals. For example, control circuitry 14 may switch HPFs 76 (FIG. 2) out of use and may switch APF 82 on bypass paths 78 into use. TX signal generator 28 may transmit N tones over transmit chain 52. The N tones may be defined from channel conditions such as resonance removal conditions (e.g., to measure channel performance). Control circuitry 14 may then memorize/record (e.g., measure and store) the amplitude and/or phase of each of the N tones as received over receive chain 54 (e.g., using measurement of offset phases, least mean squares (LMS), least squares (SQ), etc. using a multi tab filter).

At operation 162, control circuitry 14 may run a background (BG) stabilizer on the recorded amplitudes and/or phases. The BG stabilizer may include decimation, averaging, and/or interpolation of the gathered amplitudes and/or phases (e.g., stabilization operations that minimize noise or otherwise enhance the time-stability of the data).

At operation 166, control circuitry 14 may determine whether the phase and/or magnitude values are sufficiently stable after running the BG stabilizer. If the values are not sufficiently stable (e.g., exhibit excessive change over a period of time, exhibit a stability value less than a threshold stability value, etc.), the values may be insufficient for use in background cancellation and can be discarded (e.g., processing may loop back to operation 150 via path 164). If the values are sufficiently stable (e.g., exhibit relatively little change over a period of time, exhibit a stability value greater than a threshold stability value, etc.), the values may be satisfactory for use in background cancellation and processing may proceed to operation 170 via path 168.

At operation 170, control circuitry 14 (radar circuitry 26) may perform BG subtraction operations that configure radar circuitry 26 (e.g., digital BG canceller 56) to mitigate/cancel/subtract out the measured/recorded background noise during subsequent radar operations. Processing may proceed to operation 150 and radar operations may be performed while subtracting out the background noise as configured during operation 170. For example, digital BG canceller 56 may perform complex subtraction, multi-tab LMS, and/or LS on subsequently transmitted and/or received signals used in performing USR detection (e.g., at operation 114 of FIG. 5).

Figure 9:
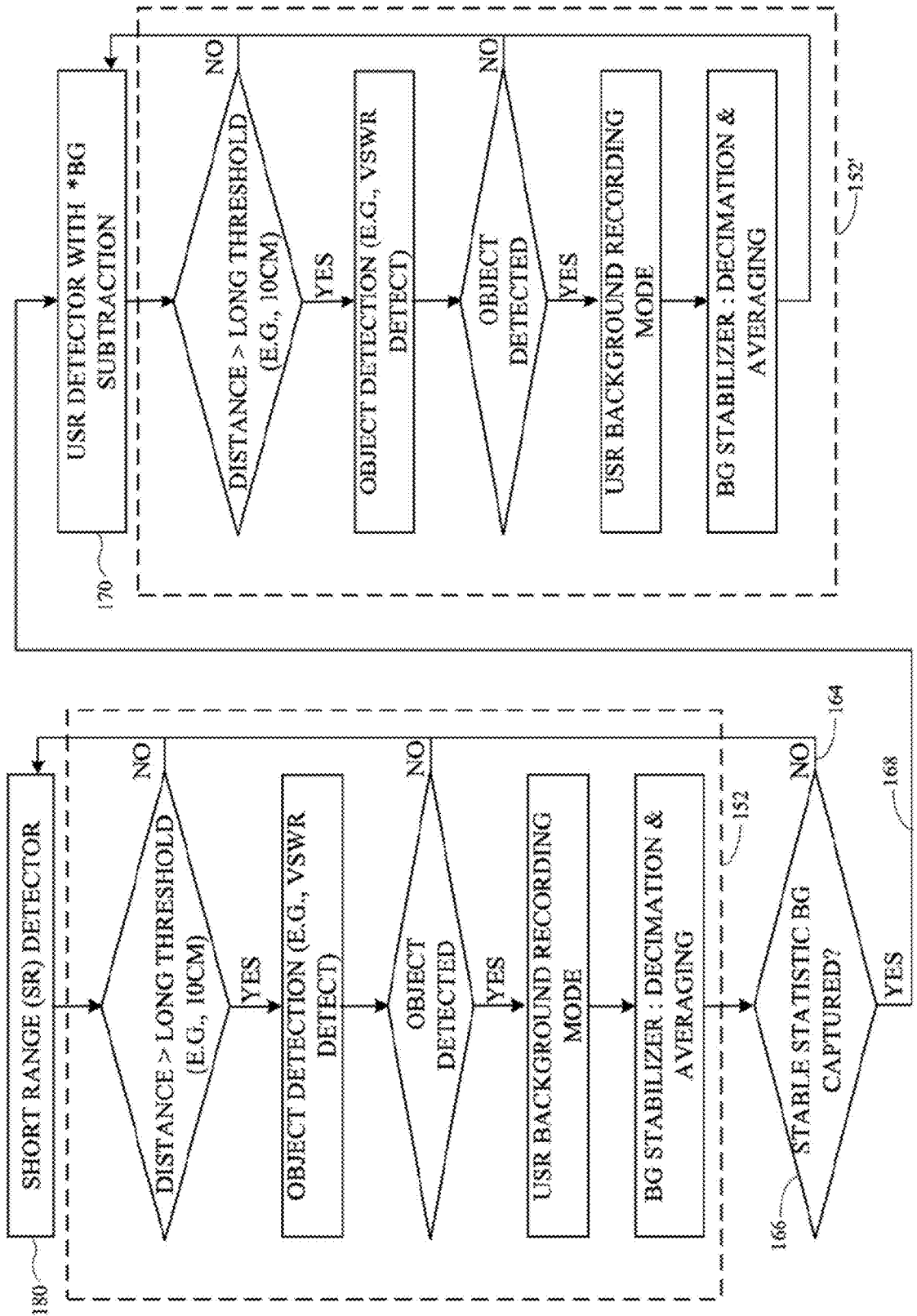
FIG. 9 is a flow chart of illustrative operations involved in performing background recording and cancellation for short range and USR detection in accordance with some embodiments.

FIG. 9 is a flow chart showing how these operations may be adapted to implementations in which radar circuitry 26 is operable to perform short range detection and then USR detection. At operation 180, radar circuitry 26 may perform short range (SR) detection using transmitted and reflected signals. SR detection may be at longer ranges than USR but shorter ranges than far field detection. Radar circuitry 26 may then perform background recording operations/algorithm 152.

At operation 166, control circuitry 14 may determine whether the phase and/or magnitude values are sufficiently stable after running the BG stabilizer in background recording operations/algorithm 152. If the values are not sufficiently stable, processing may loop back to operation 180 via path 164. If the values are sufficiently stable, processing may proceed to operation 170 via path 168.

At operation 170, radar circuitry 26 may perform USR detection using transmitted and reflected signals (e.g., transmit signals as shown by curve 102 of FIG. 3). Radar circuitry 26 may perform USR detection while subtracting/cancelling out background noise as recorded while performing background recording operations/algorithm 152 after operation 180. Radar circuitry 26 may then repeat the background recording operations/algorithm as background recording operations/algorithm 152'. Background recording operations/algorithm 152' may loop back to operation 170.

Figure 10:
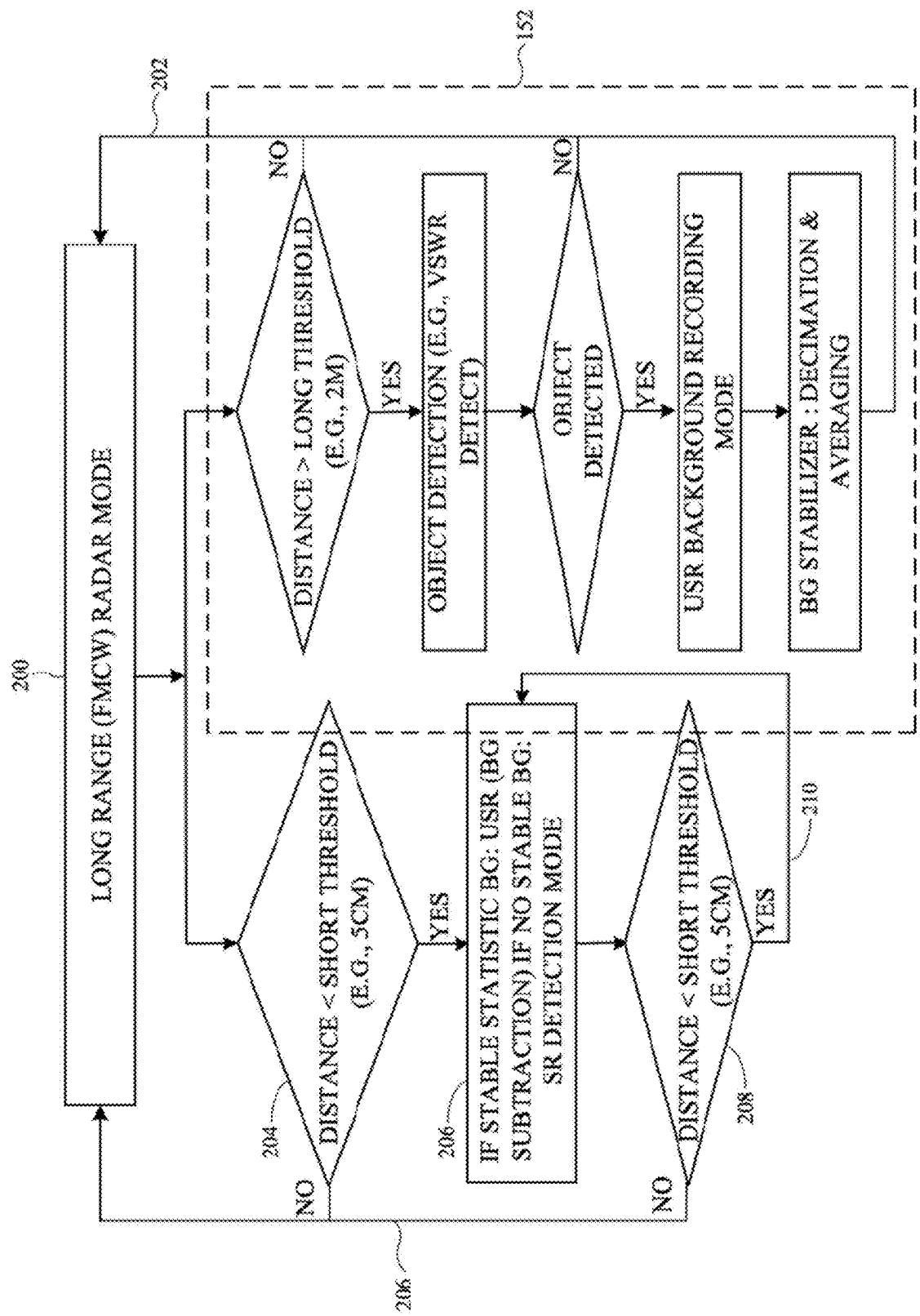
FIG. 10 is a flow chart of illustrative operations involved in performing background recording and cancellation for a hybrid radar that performs long range and USR detection in accordance with some embodiments.

FIG. 10 is a flow chart showing how these operations may be adapted to implementations in which radar circuitry 26 is operable to perform long range detection and then USR detection. At operation 200, radar circuitry 26 may perform long range detection using transmitted and reflected signals (e.g., using FMCW signals such as the signals associated with curve 100 of FIG. 3). Radar circuitry 26 may gather measurements of range R during operation 200.

If/when range R exceeds the long threshold value (e.g., 2 m) during the long range radar operations, radar circuitry 26 may proceed with performing background recording operations/algorithm 152. Background recording operations/algorithm 152 may produce and store background noise values for use during later USR operations, and processing may loop back to operation 200 via path 202.

During the long range radar operations, control circuitry 14 may determine whether range R falls below a short threshold value (e.g., 10 cm) (at operation 204). If range R does not fall below the short threshold value, processing may loop back to operation 200 via path 206. If range R falls below the short threshold value, processing may proceed to operation 206.

At operation 206, radar circuitry 26 may perform a stable statistic determination (e.g., operation 166 of FIG. 8) on the background measurements gathered during background recording operations/algorithm 152. If the background measurements are sufficiently stable, radar circuitry 26 may perform USR detection (e.g., by transmitting and receiving signals such as the signals associated with curve 102 of FIG. 3) while performing background cancellation using the background measurements gathered during background recording operations/algorithm 152 (e.g., via complex subtraction of the background measurements from the phase measurements gathered in the USR detection). If the background measurements are not sufficiently stable, radar circuitry 26 may perform SR detection (e.g., operation 180 of FIG. 9).

At operation 208, control circuitry 14 may determine if range R has fallen below the short threshold (e.g., 10 cm). If range R as detected during SR detection falls below 10 cm, processing may loop back to operation 206 via path 210. If range R is not below 10 cm, processing may loop back to operation 200 via path 206. HPF filters 76 (FIG. 2) may be switched into use on receive chain 54 at operation 200. Performing background noise subtraction may allow radar circuitry 26 to detect ranges R that are less than 10 cm, for example.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A method of operating an electronic device comprising:
    measuring, using wireless circuitry, a voltage standing wave ratio (VSWR) of one or more antennas;
    measuring, using the wireless circuitry, background noise while the measured VSWR is within a predetermined range;
    transmitting, using the wireless circuitry, a radio-frequency signal;
    receiving, using the wireless circuitry, a reflected signal associated with the radio-frequency signal; and
    estimating, using one or more processors, a range between an external object and the wireless circuitry based on the reflected signal and the measured background noise, wherein the predetermined range is associated with an additional external object being near the electronic device.

2. The method of claim 1, wherein the additional external object is a removable case.

3. The method of claim 2, wherein the VSWR values are outside of the predetermined range while the removable case is not on the electronic device.

4. The method of claim 1, further comprising:
measuring, using the wireless circuitry, a phase of the reflected signal.

5. The method of claim 4, wherein estimating the range comprises estimating the range based on the measured phase of the reflected signal.

6. The method of claim 1, wherein estimating the range comprises subtracting the measured background noise from the reflected signal.

7. The method of claim 6, wherein measuring the background noise comprises:
transmitting, using the wireless circuitry, an additional radio-frequency signal; and
receiving, using the wireless circuitry, an additional reflected signal associated with the additional radio-frequency signal.

8. The method of claim 7, wherein measuring the background noise further comprises:
decimating the additional reflected signal prior to subtracting the measured background noise from the reflected signal.

9. The method of claim 7, wherein measuring the background noise further comprises:
averaging the additional reflected signal prior to subtracting the measured background noise from the reflected signal.

10. The method of claim 7, wherein receiving the reflected signal comprises receiving the reflected signal using an antenna from the one or more antennas and wherein receiving the additional reflected signal comprises receiving the additional reflected signal using the antenna from the one or more antennas.

11. An electronic device comprising:
one or more antennas;
wireless circuitry configured to
measure background noise while a voltage standing wave ratio (VSWR) of the one or more antennas is within a predetermined range,
transmit a radio-frequency signal, and
receive a reflected signal associated with the radio-frequency signal; and
one or more processors configured to estimate a range between the electronic device and an external object based on the reflected signal and the measured background noise, wherein the predetermined range is associated with an additional external object being near the electronic device.

12. The electronic device of claim 11, wherein the additional external object is a removable case.

13. The electronic device of claim 11, wherein the wireless circuitry is configured to measure a phase of the reflected signal, the one or more processors being configured to estimate the range based on the measured phase of the reflected signal.

14. The electronic device of claim 11, wherein the wireless circuitry is configured to transmit the radio-frequency signal using the one or more antennas.

15. The electronic device of claim 11, wherein the wireless circuitry is configured to receive the reflected signal using the one or more antennas.

16. The electronic device of claim 11, the one or more processors being further configured to estimate the range by subtracting the measured background noise from the reflected signal.

17. A method of operating an electronic device comprising:
measuring, using wireless circuitry, a voltage standing wave ratio (VSWR) of an antenna;
measuring, using the wireless circuitry, background noise while the VSWR of the antenna is indicative of the electronic device being in a removable case;
generating, using the wireless circuitry, a radar measurement based on a transmitted signal and a reflected signal; and
removing, using one or more processors, the background noise from the radar measurement.

18. The method of claim 17, wherein measuring the background noise comprises:
transmitting an additional signal while the VSWR of the antenna is indicative of the electronic device being in the removable case; and
receiving an additional reflected signal while the VSWR of the antenna is indicative of the electronic device being in the removable case.

19. The method of claim 17, further comprising:
estimating, using the one or more processors, a range to an external object based on the radar measurement after removal of the background noise from the radar measurement.

20. The electronic device of claim 11, wherein the wireless circuitry comprises:
a VSWR sensor configured to measure the VSWR; and
radar circuitry configured to transmit the radio-frequency signal and configured to receive the reflected signal.

* * * * *